United States Patent
Tanaka (10) Patent No.: US 10,576,923 B2
(45) Date of Patent: Mar. 3, 2020

(54) VEHICLE SIDE PORTION STRUCTURE

(71) Applicant: Toyota Jidosha Kabushiki Kaisha, Toyota-shi, Aichi-ken (JP)

(72) Inventor: Ryusuke Tanaka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 59 days.

(21) Appl. No.: 15/903,408

(22) Filed: Feb. 23, 2018

(65) Prior Publication Data

US 2018/0244231 A1   Aug. 30, 2018

(30) Foreign Application Priority Data

Feb. 27, 2017   (JP) ................. 2017-034950

(51) Int. Cl.
  *B60R 21/0136*  (2006.01)
  *B62D 25/04*    (2006.01)
  *B60R 21/0132*  (2006.01)
  *B60R 21/01*    (2006.01)

(52) U.S. Cl.
  CPC ...... *B60R 21/0136* (2013.01); *B60R 21/0132* (2013.01); *B62D 25/04* (2013.01); *B60R 2021/01013* (2013.01)

(58) Field of Classification Search
  CPC .............. B60R 21/013; B60R 21/0132; B60R 21/0136; B62D 25/02; B62D 25/04
  USPC ......................... 296/187.12, 193.05, 193.06
  See application file for complete search history.

(56) References Cited

U.S. PATENT DOCUMENTS 6,299,238 B1 *  10/2001  Takagi ................ B60N 2/4235
                                                           296/187.12
9,849,916 B2 *  12/2017  Valencia Carrio ... B62D 25/025

FOREIGN PATENT DOCUMENTS

| JP | H09123869 A  |   | 5/1997 |
|----|--------------|---|--------|
| JP | 10059119 A   | * | 3/1998 |
| JP | H10226305 A  |   | 8/1998 |
| JP | 2000-142310 A|   | 5/2000 |

OTHER PUBLICATIONS

English Translation of JP 10-059119; retreived Jun. 26, 2019 via PatentTranslate located at www.epo.org. (Year: 2019).*

* cited by examiner

*Primary Examiner* — Jason S Daniels
(74) *Attorney, Agent, or Firm* — Dinsmore & Shohl LLP (57) ABSTRACT

A vehicle side portion structure includes: an outer member; an inner member disposed closer to a center of a vehicle than the outer member in a vehicle width direction and facing the outer member, the inner member partially fixed to the outer member, the inner member and the outer member forming a tubular shape having a space; a main wall portion provided in the space, the main wall portion extending along the outer member, the main wall portion being spaced from the outer member, an acceleration sensor fixed to the main wall portion provided with a projecting portion, the projecting portion projecting to be further from the center of the vehicle than a fixing position where the acceleration sensor is fixed in the vehicle width direction; and a fixing portion connected to the main wall portion, the fixing portion being configured to be fixed to the outer member.

8 Claims, 3 Drawing Sheets

VEHICLE SIDE PORTION STRUCTURE

CROSS-REFERENCE TO RELATED APPLICATIONS

This application claims priority to Japanese Patent Application No. 2017-034950 filed on Feb. 27, 2017, which is incorporated herein by reference in its entirety including the specification, drawings and abstract.

BACKGROUND

1. Technical Field

The present disclosure relates to a vehicle side portion structure.

2. Description of Related Art

A vehicle side portion structure of Japanese Patent Application Publication No. 9-123869 (JP 9-123869 A) includes a pillar extending from a lower side toward an upper side of a vehicle. The pillar of JP 9-123369 A includes a side member outer extending from the lower side toward the upper side of the vehicle and a side member inner disposed on a vehicle width direction inner side of the side member outer and facing the side member outer and is formed in a quadrangular tubular shape by these outer and inner members. A reinforcement for reinforcing the side member outer is fixed inside the pillar, and an acceleration sensor is fixed to the reinforcement.

SUMMARY

When an object collides with the vehicle from a vehicle width direction outer side so that the pillar is deformed, the acceleration sensor fixed to the reinforcement inside the pillar detects a corresponding acceleration. Therefore, in the vehicle provided with the acceleration sensor on the reinforcement as in the vehicle side portion structure of JP 9-123869 A, when the acceleration sensor has detected an acceleration equal to or greater than a predetermined value, it is determined that the object has collided from the vehicle width direction outer side, so that emergency control such as deployment of an airbag is performed. When performing the emergency control based on the detection result of the acceleration sensor in this way, it is necessary that the acceleration sensor can detect a change in acceleration as early as possible from the collision of the object. The vehicle side portion structure of JP 9-123869 A still has room for improvement.

A vehicle side portion structure according to a first aspect in the present disclosure includes: an outer member extending along a vehicle vertical direction; an inner member disposed closer to a center of a vehicle than the outer member in a vehicle width direction and facing the outer member, the inner member partially fixed to the outer member, the inner member and the outer member forming a tubular shape having a space; a main wall portion provided in the space, the main wall portion extending along the outer member, the main wall portion being spaced from the outer member, an acceleration sensor fixed to the main wall portion, the main wall portion being provided with a projecting portion, the projecting portion projecting to be further from the center of the vehicle than a fixing position where the acceleration sensor is fixed in the vehicle width direction; and a fixing portion connected to the main wall portion, the fixing portion being configured to be fixed to the outer member.

In the above-described aspect, when an object has collided with the vehicle from the vehicle width direction outer side, the outer member is deformed toward the vehicle width direction inner side. According to the above-described aspect, the timing at which the deformed outer member comes into contact with the main wall portion becomes earlier by a distance in which the projecting portion provided to the main wall portion to which the acceleration sensor is fixed projects toward the vehicle width direction outer side. Consequently, the acceleration sensor provided in the vehicle side portion can detect early a change in acceleration caused by the collision of the object with the vehicle from the vehicle width direction outer side.

In the above-described aspect, the fixing portion and the main wall portion may constitute a reinforcement.

In the above-described aspect, the fixing portion may be fixed to an inner surface of the outer member in the vehicle width direction.

In the above-described aspect, the acceleration sensor may be fixed to a surface, facing the inner member, of the main wall portion.

In the above-described aspect, when an object has collided with the vehicle from the vehicle width direction outer side, the outer member is deformed toward the vehicle width direction inner side. According to the above-described aspect, the timing at which the reinforcement comes into contact with the deformed outer member becomes earlier by a projection distance of the projecting portion of the reinforcement toward the vehicle width direction outer side. By contacting the reinforcement with the deformed outer member at this earlier timing, it is possible to deform the reinforcement at an earlier stage, so that the acceleration sensor can detect a change in acceleration caused by such deformation. That is, according to the shape of the reinforcement of the above-described aspect, compared to the shape not provided with the projecting portion, the acceleration sensor fixed to the main wall portion of the reinforcement can detect a change in acceleration early.

In the above-described aspect, the outer member may include an outer wall portion, a pair of side wall portions, and a pair of flange portions. The outer wall portion may extend along the vehicle vertical direction. The pair of side wall portions may respectively extend toward the center of the vehicle in the vehicle width direction from edges in a vehicle longitudinal direction of the outer wall portion. The pair of flange portions each extend in a direction of separating each other from an inner edge in the vehicle width direction of the side wall portion corresponding to each flange portion.

In the above-described aspect, the pair of side wall portions may include a front side wall portion extending toward the inner member from a front edge of the outer wall portion in the vehicle longitudinal direction, and a rear side wall portion extending toward the inner member from a rear edge of the outer wall portion in the vehicle longitudinal direction.

In the above-described aspect, the pair of flange portions may include a front flange portion extending forward of the vehicle from the inner edge of the front side wall portion in the vehicle width direction, and a rear flange portion extending rearward of the vehicle from the inner edge of the rear side wall portion in the vehicle width direction.

In the above-described aspect, the outer member may include, at lower portion of the outer member in the vehicle vertical direction, a skirt portion in which the pair of side wall portions each extend in an arc shape so as to be separate each other in the vehicle longitudinal direction as going downward of the vehicle. The projecting portion is provided within a range in the vehicle vertical direction, the range being same as a range in the vehicle vertical direction in which the skirt portion is provided.

When another vehicle collides with the vehicle from the side, the possibility is high that a front bumper that may first collide with the vehicle, of the other vehicle collides with the side portion of the vehicle. In general, the height position of a front bumper of a vehicle is a position in the vicinity of a lower end portion of a pillar. Therefore, when the front bumper of the other vehicle collides from the vehicle width direction outer side, a large load is applied to the vicinity of a lower end portion of the outer member, so that the outer member is likely to be deformed in the vicinity of its lower end portion.

According to the above-described aspect, the projecting portion of the reinforcement is provided within the height range of the skirt portion which is a part on the lower side of the outer member. By providing the projecting portion of the reinforcement corresponding to the position of the skirt portion, which tends to be deformed when the front bumper collides, of the outer member in this way, it is possible to contact the deformed outer member with the projecting portion earlier.

In the above-described aspect, the projecting portion may include a raised portion that is raised to be further from the center of the vehicle than the fixing position in the vehicle width direction. When a virtual straight line is drawn on the raised portion along its raising direction in sectional view perpendicular to a vehicle longitudinal direction, the raised portion may have a portion that is inclined such that the acceleration sensor is located on the virtual straight line.

According to the above-described aspect, when an object collides with the vehicle from the vehicle width direction outer side, a load from the vehicle width direction outer side can be transmitted to the main wall portion as a force in a direction along the raising direction of the raised portion. Since the raised portion has the portion that is inclined such that the acceleration sensor is located on the virtual straight line, the load from the vehicle width direction outer side can be transmitted to the main wall portion as a force in a direction toward the acceleration sensor. Therefore, deformation that displaces the position of the acceleration sensor tends to occur in the main wall portion, so that the acceleration sensor easily detects the deformation of the main wall portion as a change in acceleration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
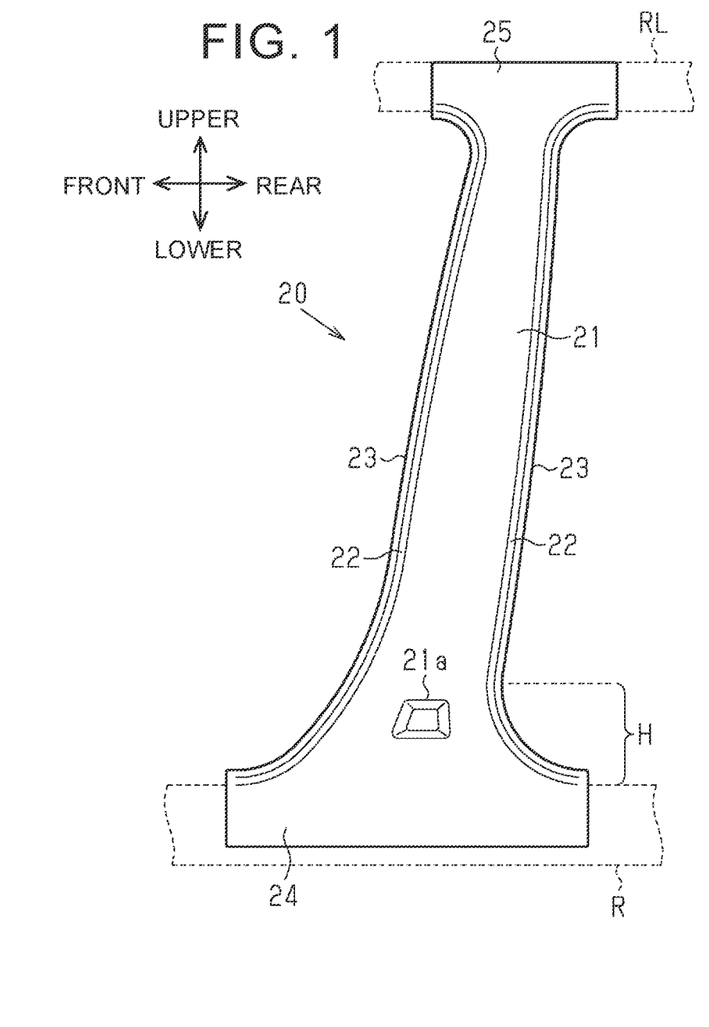
FIG. 1 is a side view of a side member outer.
Figure 2:
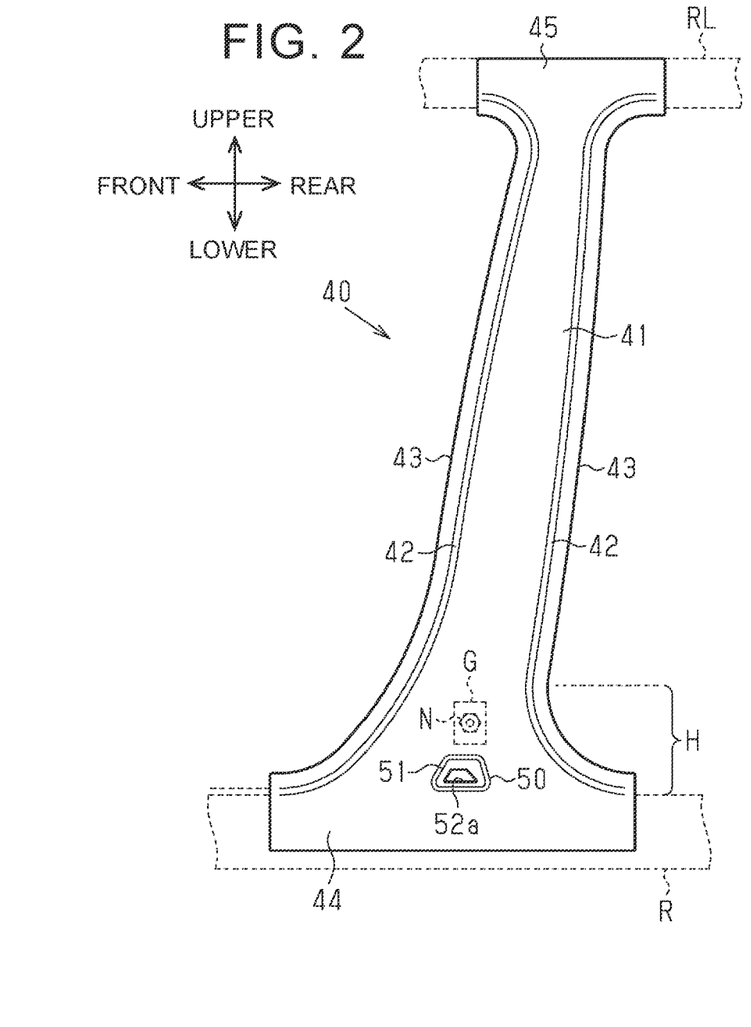
FIG. 2 is a side vide of a reinforcement.
Figure 3:
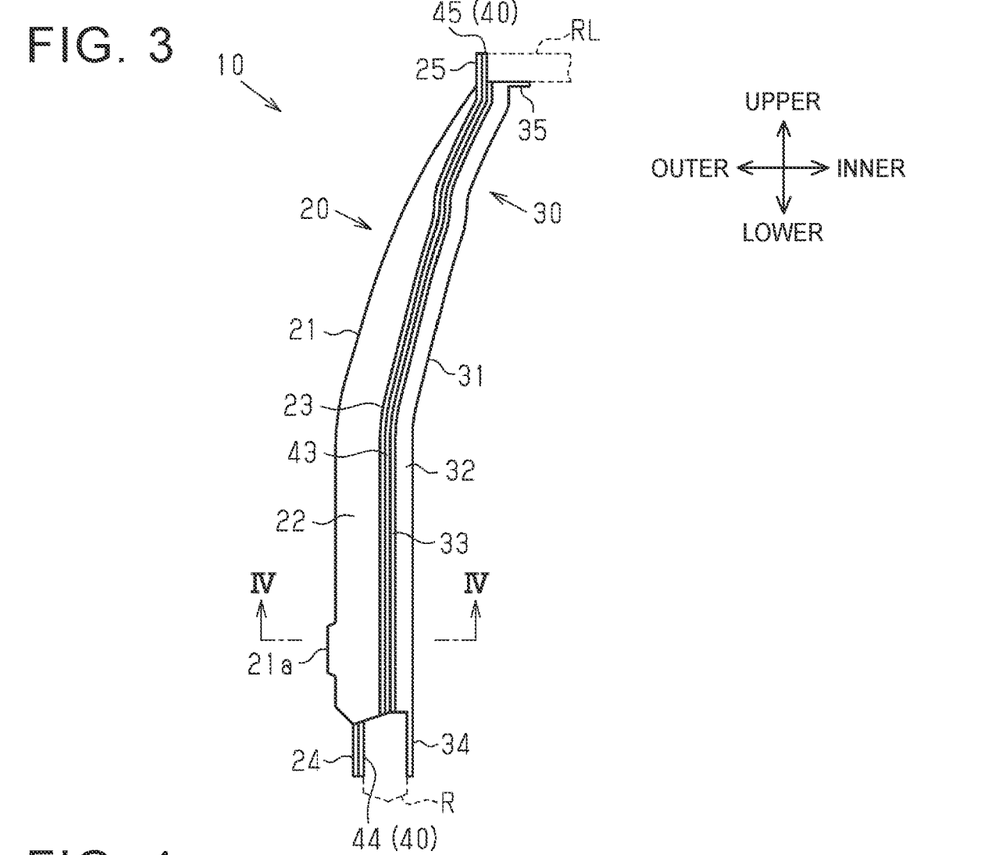
FIG. 3 is a rear view of a pillar.

Hereinbelow, an embodiment of a vehicle side portion structure will be described. While a vehicle is provided with pillars 10 on both sides in a vehicle width direction, the pillar 10 on the vehicle width direction left side will be described hereinbelow by way of example. As shown in FIG. 3, the pillar 10 in the vehicle side portion structure includes a side member outer 20 as an outer member extending from a lower side toward an upper side of the vehicle. A lower end portion of the side member outer 20 is fixed to a rocker portion R having a generally quadrangular tubular shape and extending in a vehicle longitudinal direction at a lower end of a vehicle side portion. An upper end portion of the side member outer 20 is fixed to a rail outer RL supporting a ceiling of the vehicle. A side member timer 30 as an inner member is disposed on a vehicle width direction inner side of the side member outer 20 and faces the side member outer 20. Like the side member outer 20, a lower end portion of the side member inner 30 is fixed to the rocker portion R. Further, like the side member outer 20, an upper end portion of the side member inner 30 is fixed to the rail outer RL. The pillar 10 having a generally quadrangular tubular shape with a space therein is formed by the side member outer 20 and the side member inner 30. In FIGS. 1 to 3, the rocker portion R and the rail outer RL are shown by broken lines.

As shown in FIG. 1, the side member outer 20 includes a plate-shaped outer wall portion 21 facing the side member inner 30 and extending from the lower side toward the upper side of the vehicle. As shown in FIG. 3, the outer wall portion 21 extends in a generally vehicle vertical direction at its lower approximately half portion, while, at its upper approximately half portion, the outer wall portion 21 is curved toward the vehicle width direction inner side as going toward the vehicle upper side.

As shown in FIG. 1, a portion which is a part on the lower side of the side member outer 20 within a predetermined range above the rocker portion R is defined as a skirt portion H. In the skirt portion H, the width in the vehicle longitudinal direction of the outer wall portion 21 increases toward the vehicle lower side. Further, in the skirt portion H, the rate of increase in the width in the vehicle longitudinal direction of the outer wall portion 21 increases toward the vehicle lower side. That is, in the skirt portion H of the side member outer 20, edges in the vehicle longitudinal direction of the outer wall portion 21 each extend in an arc shape so as to be located gradually more on a vehicle longitudinal direction outer side as going toward the vehicle lower side. That is, the edge on a vehicle longitudinal direction front side of the outer wall portion 21 extends in the arc shape so as to be located more on the vehicle longitudinal direction front side as going toward the vehicle lower side, while the edge on a vehicle longitudinal direction rear side of the outer wall portion 21 extends in the arc shape so as to be located more on the vehicle longitudinal direction rear side as going toward the vehicle lower side.

In a middle portion in the vehicle vertical direction of the side member outer 20 above the skirt portion H, the width in the vehicle longitudinal direction of the outer wall portion 21 slightly decreases toward the vehicle upper side. In this portion, the rate of decrease in the width in the vehicle longitudinal direction of the outer wall portion 21 is approximately constant so that the edges in the vehicle longitudinal direction of the outer wall portion 21 each extend generally straight. In an upper end portion of the side member outer 20, the width in the vehicle longitudinal direction of the outer wall portion 21 increases toward the vehicle upper side. Further, in this portion, the rate of increase in the width in the vehicle longitudinal direction of the outer wall portion 21 increases toward the vehicle upper side. That is, at a part on the vehicle vertical direction upper side of the outer wall portion 21, the edges in the vehicle longitudinal direction of the outer wall portion 21 each extend in an arc shape so as to be located gradually more on the vehicle longitudinal direction outer side as going toward the vehicle upper side.

Figure 4:
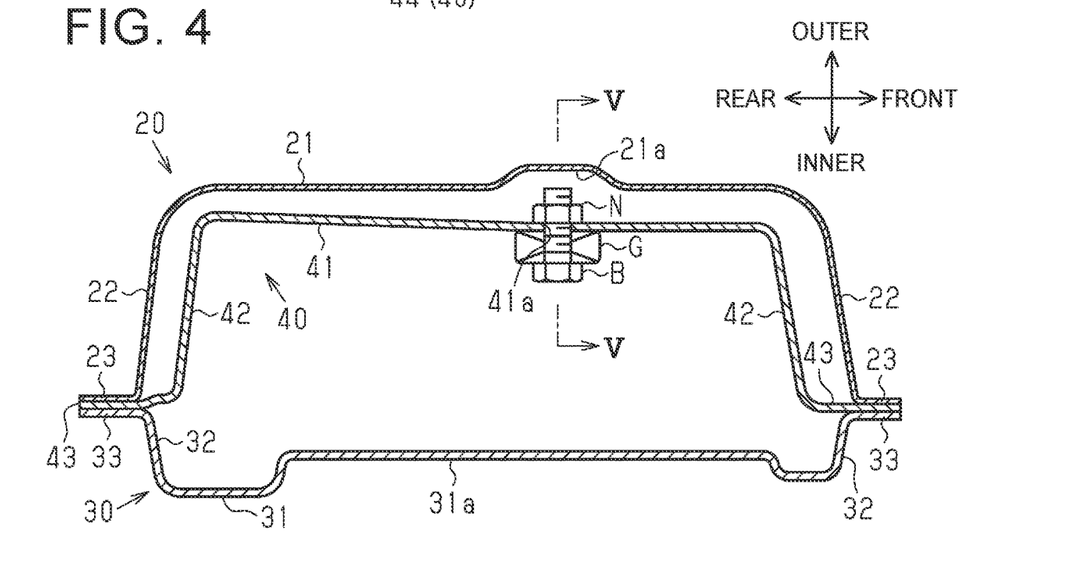
FIG. 4 is a sectional view taken along line 4-4 of FIG. 3.

As shown in FIGS. 1 and 4, the outer wall portion 21 is provided with a recessed portion 21a that is recessed toward a vehicle width direction outer side as viewed from the vehicle width direction inner side. As shown in FIG. 1, the recessed portion 21a has a generally trapezoidal shape in side view from the vehicle width direction outer side. As shown in FIG. 4, the dimension in the vehicle longitudinal direction of the recessed portion 21a decreases toward the vehicle width direction outer side in sectional view perpendicular to the vehicle vertical direction. That is, the recessed portion 21a is recessed into a truncated quadrangular pyramid shape on the whole. As shown in FIG. 1, the recessed portion 21a is located approximately in the middle in the vehicle longitudinal direction of the outer wall portion 21. The recessed portion 21a is located within a range of the skirt portion H in the vehicle vertical direction.

As shown in FIG. 4, a pair of side wall portions 22 respectively extend toward the vehicle width direction inner side (the side member inner 30 side) from the edges in the vehicle longitudinal direction of the outer wall portion 21. Specifically, the front side wall portion 22 extends toward the vehicle width direction inner side from the edge on the vehicle longitudinal direction front side of the outer wall portion 21, while the rear side wall portion 22 extends toward the vehicle width direction inner side from the edge on the vehicle longitudinal direction rear side of the outer wall portion 21. Each side wall portion 22 is provided over the entire region in the extending direction of the outer wall portion 21. A flange portion 23 extends toward the vehicle longitudinal direction outer side from an edge on the vehicle width direction inner side of each side wall portion 22. Specifically, the front flange portion 23 extends toward the vehicle longitudinal direction front side from the edge on the vehicle width direction inner side of the front side wall portion 22, while the rear flange portion 23 extends toward the vehicle longitudinal direction rear side from the edge on the vehicle width direction inner side of the rear side wall portion 22. Each flange portion 23 is provided over the entire region in the extending direction of the side wall portion 22.

As shown in FIG. 1, also in the skirt portion H of the side member outer 20, each side wall portion 22 extends along the extending direction of the edge in the vehicle longitudinal direction of the outer wall portion 21. That is, in the skirt portion H, each side wall portion 22 extends in an arc shape so as to be located more on the vehicle longitudinal direction outer side as going toward the vehicle lower side.

A lower wall portion 24 extends toward the vehicle lower side from an edge on the vehicle vertical direction lower side of the outer wall portion 21 in the side member outer 20. The lower wall portion 24 has a rectangular shape elongated in the vehicle longitudinal direction in side view. As shown in FIG. 3, a surface on the vehicle width direction inner side of the lower wall portion 24 is fixed to the rocker portion R.

As shown in FIG. 1, an upper wall portion 25 extends toward the vehicle upper side from an edge on the vehicle vertical direction upper side of the outer wall portion 21 in the side member outer 20. The upper wall portion 25 has a rectangular shape elongated in the vehicle longitudinal direction in side view. As shown in FIG. 3, a surface on the vehicle width direction inner side of the upper wall portion 25 is fixed to the rail outer RL.

As shown in FIG. 4, the side member inner 30 includes a plate-shaped inner wall portion 31 facing the outer wall portion 21 of the side member outer 20 and extending from the lower side toward the upper side of the vehicle. As shown in FIG. 3, the inner wall portion 31 extends in the generally vehicle vertical direction at its lower approximately half portion so as to be parallel to the outer wall portion 21 of the side member outer 20, while, at its upper approximately half portion, the inner wall portion 31 is curved toward the vehicle width direction inner side as going toward the vehicle upper side.

The width in the vehicle longitudinal direction of the inner wall portion 31 is like that of the outer wall portion 21 of the side member outer 20. That is, in a skirt portion H of the side member inner 30, the width in the vehicle longitudinal direction of the inner wall portion 31 increases toward the vehicle lower side, and the rate of increase in the width in the vehicle longitudinal direction of the inner wall portion 31 also increases toward the vehicle lower side. In a middle portion in the vehicle vertical direction of the side member inner 30 above the skirt portion H, the width in the vehicle longitudinal direction of the inner wall portion 31 slightly decreases toward the vehicle upper side. In an upper end portion of the side member inner 30, the width in the vehicle longitudinal direction of the inner wall portion 31 increases toward the vehicle upper side. Further, the rate of increase in the width in the vehicle longitudinal direction of the inner wall portion 31 also increases toward the vehicle upper side.

As shown in FIG. 4, a protruding portion 31a protruding toward the vehicle width direction outer side from the vehicle width direction inner side is provided in a middle portion in the vehicle longitudinal direction of the inner wall portion 31. The protruding portion 31a has a flat generally quadrangular shape in sectional view. The protruding portion 31a extends over approximately the entire region in the vehicle vertical direction of the inner wall portion 31.

A pair of side wall portions 32 respectively extend toward the vehicle width direction outer side (the side member outer 20 side) from edges in the vehicle longitudinal direction of the inner wall portion 31. Specifically, the front side wall portion 32 extends toward the vehicle width direction outer side from the edge on the vehicle longitudinal direction front side of the inner wall portion 31, while the rear side wall portion 32 extends toward the vehicle width direction outer side from the edge on the vehicle longitudinal direction rear side of the inner wall portion 31. Each side wall portion 32 is provided over the entire region in the extending direction of the inner wall portion 31. The length in the vehicle width direction of each side wall portion 32 is shorter than that of the side wall portion 22 of the side member outer 20. A flange portion 33 extends toward the vehicle longitudinal direction outer side from an edge on the vehicle width direction outer side of each side wall portion 32 in the side member inner 30. Specifically, the front flange portion 33 extends toward the vehicle longitudinal direction front side from the edge on the vehicle width direction outer side of the front side wall portion 32, while the rear flange portion 33 extends toward the vehicle longitudinal direction rear side from the edge on the vehicle width direction outer side of the rear side wall portion 32. Each flange portion 33 is provided over the entire region in the extending direction of the side wall portion 32. The flange portions 33 are disposed to respectively face the flange portions 23 of the side member outer 20. That is, the front flange portion 23 of the side member outer 20 and the front flange portion 33 of the side member inner 30 are disposed to face each other, while the rear flange portion 23 of the side member outer 20 and the rear flange portion 33 of the side member inner 30 are disposed to face each other.

As shown in FIG. 3, a lower wall portion 34 extends toward the vehicle vertical direction lower side from an edge on the vehicle vertical direction lower side of the inner wall portion 31 in the side member inner 30. The lower wall portion 34 has a rectangular shape elongated in the vehicle longitudinal direction in side view. A surface on the vehicle width direction outer side of the lower wall portion 34 is in surface contact with a surface on the vehicle width direction inner side of the rocker portion R, and these surfaces are fixed to each other by welding. An upper wall portion 35 extends toward the vehicle width direction inner side from an edge on the vehicle vertical direction upper side of the inner wall portion 31 in the side member inner 30. An upper surface of the upper wall portion 35 is in surface contact with a lower surface of the rail outer RL, and these surfaces are fixed to each other by welding.

As shown in FIG. 4, a reinforcement 40 for reinforcing, the side member outer 20 is fixed in the space defined by the side member outer 20 and the side member inner 30. The reinforcement 40 includes a plate-shaped main wall portion 41 facing the outer wall portion 21 of the side member outer 20 and extending from the lower side toward the upper side of the vehicle. The main wall portion 41 is spaced from the outer wall portion 21 of the side member outer 20 toward the vehicle width direction inner side and extends along the outer wall portion 21 on the whole. Specifically, like the outer wall portion 21 of the side member outer 20, the main wall portion 41 extends in the generally vehicle vertical direction at its lower approximately half portion, while, at its upper approximately half portion, the main wall portion 41 is curved toward the vehicle width direction inner side as going toward the vehicle upper side.

As shown in FIG. 2, the width in the vehicle longitudinal direction of the main wall portion 41 is like that of the outer wall portion 21 of the side member outer 20. That is, a portion which is a part on the lower side of the reinforcement 40 within a predetermined range above the rocker portion R is defined as a skirt portion H. In the skirt portion H, the rate of increase in the width in the vehicle longitudinal direction of the main wall portion 41 increases toward the vehicle lower side. That is, in the skirt portion H of the reinforcement 40, edges in the vehicle longitudinal direction of the main wall portion 41 each extend in an arc shape so as to be located gradually more on the vehicle longitudinal direction outer side as going toward the vehicle lower side. That is, the edge on the vehicle longitudinal direction front side of the main wall portion 41 extends in the arc shape gradually toward the vehicle longitudinal direction front side as going toward the vehicle lower side, while the edge on the vehicle longitudinal direction rear side of the main wall portion 41 extends in the arc shape gradually toward the vehicle longitudinal direction rear side as going toward the vehicle lower side. The range of the skirt portion H in the reinforcement 40 and the range of the skirt portion H in the side member outer 20 are the same in the vehicle vertical direction. The dimension in the vehicle longitudinal direction of the main wall portion 41 is shorter than that of the outer wall portion 21 of the side member outer 20 at the same height position so that both end portions in the vehicle longitudinal direction of the main wall portion 41 do not interfere with the side wall portions 22 of the side member outer 20.

As shown in FIG. 4, a pair of side wall portions 42 respectively extend toward the vehicle width direction inner side (the side member inner 30 side) from the edges in the vehicle longitudinal direction of the main wall portion 41. Specifically, the front side wall portion 42 extends toward the vehicle width direction inner side from the edge on the vehicle longitudinal direction front side of the main wall portion 41, while the rear side wall portion 42 extends toward the vehicle width direction inner side from the edge on, the vehicle longitudinal direction rear side of the main wall portion 41. Each side wall portion 42 is provided over the entire region in the extending direction of the main wall portion 41. The dimension in the vehicle width direction of each side wall portion 42 is shorter than that of the side wall portion 22 of the side member outer 20. The difference between the dimension in the vehicle width direction of the side wall portion 42 of the reinforcement 40 and that of the side wall portion 22 of the side member outer 20 corresponds to an interval between the main wall portion 41 of the reinforcement 40 and the outer wall portion 21 of the side member outer 20. A flange-like fixing portion 43 extends toward the vehicle longitudinal direction outer side from an edge on the vehicle width direction inner side of each side wall portion 42. Each fixing portion 43 is provided over the entire region in the extending direction of the side wall portion 42. Specifically, the front fixing portion 43 extends toward the vehicle longitudinal direction front side from the edge on the vehicle width direction inner side of the front side wall portion 42, while the rear fixing portion 43 extends toward the vehicle longitudinal direction rear side from the edge on the vehicle width direction inner side of the rear side wall portion 42.

The fixing portion 43 is fixed by welding to the flange portion 23 of the side member outer 20 and to the flange portion 33 of the side member inner 30 in a state where the fixing portion 43 is sandwiched between the flange portion 23 and the flange portion 33. That is, the flange portion 23 of the side member outer 20, the fixing portion 43 of the reinforcement 40, and the flange portion 33 of the side member inner 30 are fixed together by welding in a stacked state.

As shown in FIG. 2, a lower wall portion 44 extends toward the vehicle lower side from a lower edge of the main wall portion 41 of the reinforcement 40. The lower wall portion 44 has a rectangular shape elongated in the vehicle longitudinal direction in side view. As shown in FIG. 3, a surface on the vehicle width direction inner side of the lower wall portion 44 is fixed by welding to the rocker portion R, while a surface on the vehicle width direction outer side of the lower wall portion 44 is fixed by welding to the surface on the vehicle width direction inner side of the lower wall portion 24 of the side member outer 20.

As shown in FIG. 2, an upper wall portion 45 extends toward the vehicle upper side from an upper edge of the main wall portion 41 of the reinforcement 40. The upper wall portion 45 has a rectangular shape elongated in the vehicle longitudinal direction in side view. As shown in FIG. 3, a surface on the vehicle width direction inner side of the upper wall portion 45 is fixed to a surface on the vehicle width direction outer side of the rail outer RL, while a surface on the vehicle width direction outer side of the upper wall portion 45 is fixed to the surface on the vehicle width direction inner side of the upper wall portion 25 of the side member outer 20.

Figure 5:
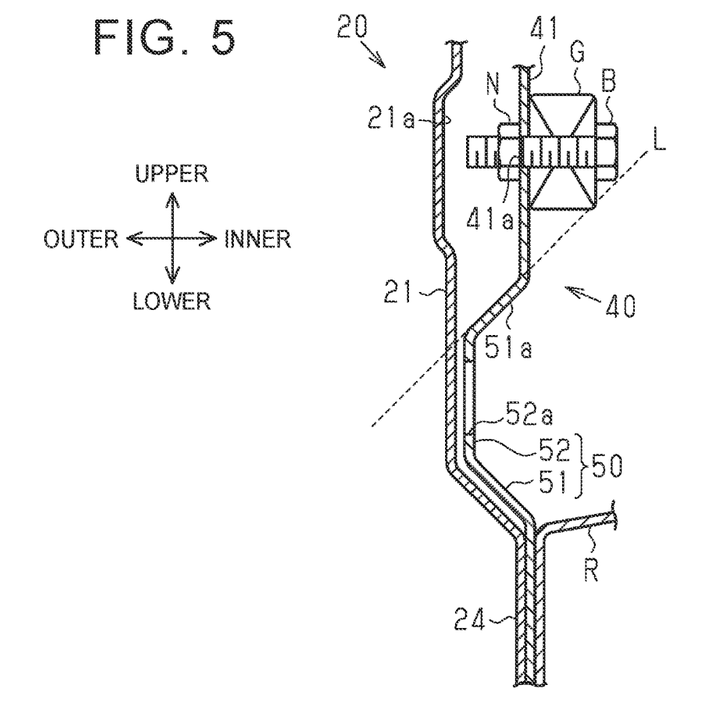
FIG. 5 is a sectional view taken along line 5-5 of FIG. 4.
Figure 6:
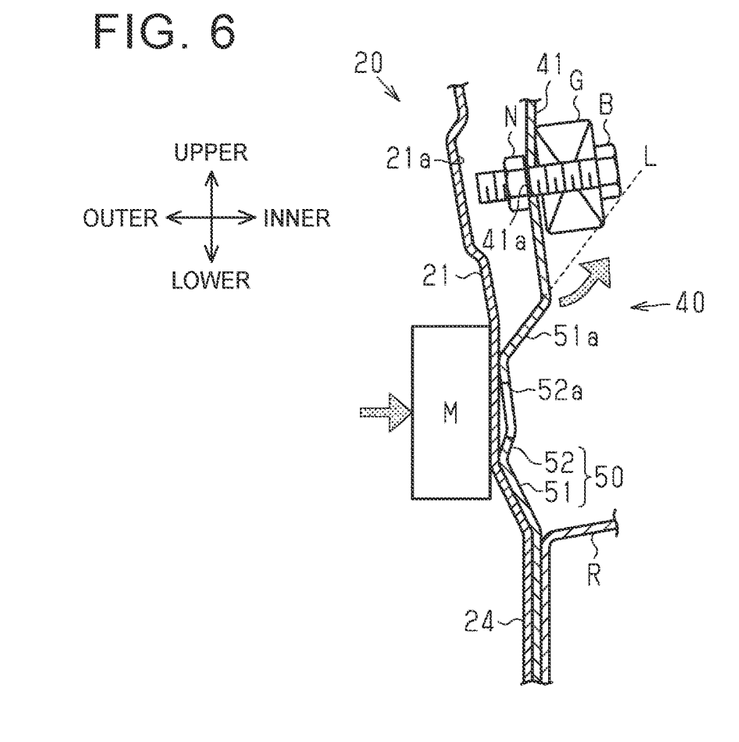
FIG. 6 is a sectional view for explaining deformation of a projecting portion of the reinforcement.

As shown in FIG. 5, an acceleration sensor G is fixed by a bolt B and a nut N to the main wall portion 41 of the reinforcement 40 on the vehicle width direction inner side. Specifically, the main wall portion 41 is provided with a bolt hole 41a for inserting the bolt B therethrough. The bolt B is inserted through the acceleration sensor G from the vehicle width direction inner side and passes through the bolt hole 41a of the main wall portion 41. The bolt B is, on its front end side, screwed into the nut N on the vehicle width direction outer side of the main wall portion 41. The front end of the bolt B protrudes more toward the vehicle width direction outer side than the nut N. A fixing position of the acceleration sensor G to the main wall portion 41 faces the recessed portion 21a of the outer wall portion 21 of the side member outer 20 in the vehicle width direction. That is, the position of the bolt hole 41a of the main wall portion 41 is a position facing the recessed portion 21a of the outer wall portion 21 of the side member outer 20 in the vehicle width direction. In FIGS. 4 to 6, the acceleration sensor G is shown by omitting illustration of its internal structure.

The main wall portion 41 of the reinforcement 40 is provided with a projecting portion 50 projecting more toward the vehicle width direction outer side than the fixing position of the acceleration sensor G to the main wall portion 41, i.e. the position where the bolt hole 41a is provided. Consequently, the distance from the projecting portion 50 to the outer wall portion 21 is shorter than the distance from the front end of the bolt B to the outer wall portion 21. As shown in FIG. 2, the projecting portion 50 is located below the fixing position of the acceleration sensor G (the position where the bolt hole 41a is provided) within a range of the skirt portion H in the vehicle vertical direction. The projecting portion 50 has a generally truncated quadrangular pyramid shape.

As shown in FIG. 5, the projecting portion 50 includes a raised portion 51 that is raised toward the vehicle width direction outer side from a portion, where the projecting portion 50 is not provided, of the main wall portion 41. The raised portion 51 forms four side faces of the truncated quadrangular pyramid. As shown in FIG. 2, in side view from the vehicle width direction outer side, the raised portion 51 extends in a generally trapezoidal shape with a shorter base on the vehicle upper side and a longer base on the vehicle lower side. As shown in FIG. 5, the raised portion 51 is inclined toward the center in the vehicle vertical direction of the trapezoid as going toward the vehicle width direction outer side. A front end wall portion 52 extends from edges on the vehicle width direction outer side of the raised portion 51 toward the center in the vehicle vertical direction of the trapezoid. The front end wall portion 52 is formed at its central portion with a trapezoidal opening 52a. The projecting portion 50 is formed by deforming a part of the main wall portion 41 by pressing or the like.

As shown in FIG. 5, when a virtual straight line L is drawn on the raised portion 51 of the projecting portion 50 along its raising direction in sectional view perpendicular to the vehicle longitudinal direction, the raised portion 51 has a portion that is inclined such that the acceleration sensor G is located on the virtual straight line L. That is, when the virtual straight line L is drawn along the raising direction, at least one of the four side faces, formed by the raised portion 51, of the truncated quadrangular pyramid, i.e. at least one of the four raised side surfaces of the raised portion 51, is inclined such that the acceleration sensor G is located on the virtual straight line L. Specifically, an upper portion 51a (a portion along the shorter base of the trapezoid) of the raised portion 51 is inclined so as to be located upward as going toward the vehicle width direction inner side in sectional view perpendicular to the vehicle longitudinal direction. Then, when a virtual straight line L is drawn on an outer surface of the upper portion 51a and extended according to the inclination of the upper portion 51a, the acceleration sensor G is located on the virtual straight line L. In this embodiment, a lower end portion on the vehicle width direction inner side of the acceleration sensor G is located on the virtual straight line L.

The operation and effect of the vehicle side portion structure configured as described above will be described. As shown in FIG. 6, when an object M collides with the vehicle from the vehicle width direction outer side, a collision portion, colliding with the object M, of the side member outer 20 is deformed toward the vehicle width direction inner side. When the reinforcement 40 is not provided with the projecting portion 50, until the side member outer 20 is deformed to the position, where the bolt hole 41a is formed, of the main wall portion 41 in the vehicle width direction, the side member outer 20 cannot come into contact with the main wall portion 41 of the reinforcement 40.

According to the above-described embodiment, the main wall portion 41 of the reinforcement 40 is provided with the projecting portion 50 projecting more toward the vehicle width direction outer side than the bolt hole 41a of the main wall portion 41. The timing at which the reinforcement 40 comes into contact with the side member outer 20 deformed toward the vehicle width direction inner side becomes earlier by a projection distance of the projecting portion 50 toward the vehicle width direction outer side. By contacting the reinforcement 40 with the deformed side member outer 20 at this earlier timing, it is possible to deform the reinforcement 40 at an earlier stage. As a result, the acceleration sensor G can detect a change in acceleration caused by the deformation of the reinforcement 40 earlier than when the projecting portion 50 is not provided.

When the object M that collides with the vehicle from the vehicle width direction outer side is another vehicle, the possibility is high that a front bumper of the other vehicle collides with the vehicle side portion structure of the above-described embodiment. In general, the height position of a front bumper of a vehicle is slightly above the rocker portion R, i.e. at or in the vicinity of the skirt portion H of the side member outer 20. Therefore, when the front bumper of the other vehicle collides from the vehicle width direction outer side, a large load is applied to the skirt portion H of the side member outer 20, so that the side member outer 20 is likely to be deformed in the skirt portion H.

In the above-described embodiment, the skirt portion H of the reinforcement 40 is provided at the same height position as the skirt portion H of the side member outer 20, and the projecting portion 50 is provided within the range of the skirt portion H of the reinforcement 40. That is, the projecting portion 50 of the reinforcement 40 is provided corresponding to the position where the side member outer 20 tends to be deformed when the front bumper of the other vehicle collides from the vehicle width direction outer side. Therefore, for example, compared to a case where the projecting portion 50 is provided at a portion, above the skirt portion H, of the main wall portion 41, when the front bumper of the other vehicle has collided to deform the side member outer 20, it is possible to contact the deformed side member outer 20 with the projecting portion 50 of the reinforcement 40 earlier.

Even when the deformed side member outer 20 comes into contact with the projecting portion 50 of the reinforcement 40, if deformation does not occur in the vicinity of the bolt hole 41a in the main wall portion 41 of the reinforcement 40, it is difficult fir the acceleration sensor G to detect deformation of the reinforcement 40 as a change in acceleration. Specifically, as shown in FIG. 6, it is assumed that the object M has collided horizontally from the vehicle width direction outer side toward the vehicle width direction inner side so that a horizontal load due to the collision is applied to the front end wall portion 52 of the projecting portion 50 of the reinforcement 40 via the deformed side member outer 20. In this event, if the projecting portion 50 is deformed so as to be buckled to the vehicle width direction inner side, there is a possibility that merely the projecting portion 50 is deformed only so that the vicinity of the bolt hole 41a in the main wall portion 41 is not largely deformed.

In the above-described embodiment, the raised portion 51 of the projecting portion 50 is inclined and further the acceleration sensor G is located on the virtual straight line L that is extended according to the inclination of the upper portion 51a of the raised portion 51. Therefore, even when a load from the colliding object M is horizontally applied to the reinforcement 40 via the side member outer 20, the load is transmitted to a portion, above the projecting portion 50, of the main wall portion 41 as a force in a direction toward the acceleration sensor G along the virtual straight line L in the raised portion 51. Therefore, as shown by arrows in FIG. 6, when the load from the vehicle width direction outer side is applied, it is possible to deform the main wall portion 41 of the reinforcement 40 in such a way that a portion between the bolt hole 41a and the projecting portion 50 in the main wall portion 41 is displaced toward the vehicle width direction inner side. If it is possible to deform the main wall portion 41 in this way, since the position of the acceleration sensor G is also displaced accordingly, the acceleration sensor G easily detects deformation of the main wall portion 41 as a change in acceleration.

In the above-described embodiment, the front end of the belt B for fixing the acceleration sensor G to the main wall portion 41 of the reinforcement 40 protrudes more toward the vehicle width direction outer side than the nut N that is located on a surface on the vehicle width direction outer side of the main wall portion 41. The outer wall portion 21 of the side member outer 20 is provided with the recessed portion 21a corresponding to a position of the front end of the bolt B. Therefore, for example, in a state where the object M is not in collision on the vehicle width direction outer side, it can be prevented that the front end of the bolt B comes into contact with a surface on the vehicle width direction inner side of the side member outer 20 due to vibration during travel of the vehicle or the like. Accordingly, the occurrence of abnormal noise due to contact of the front end of the bolt B with the surface on the vehicle width direction inner side of the side member outer 20 can be prevented, and it can also be prevented that vibration that occurs when the front end of the bolt B comes into contact with the surface on the vehicle width direction inner side of the side member outer 20 is transmitted to the acceleration sensor G and erroneously detected as a change in acceleration.

The above-described embodiment can be changed as follows. The shape of the side member outer 20 can be changed as appropriate. For example, the width in the vehicle longitudinal direction of the outer wall portion 21 of the side member outer 20 may be constant over its entirety in the vehicle vertical direction. Further, for example, a wall portion extending in an arc shape may be provided instead of the outer wall portion 21 and the side wall portions 22 in the side member outer 20. That is, the side member outer 20 may have any structure that forms, jointly with the side member inner 30, a generally tubular shape having a space therein. This also applies to the shape of the side member inner 30.

The recessed portion 21a of the outer wall portion 21 of the side member outer 20 can be omitted. When the bolt B fixing the acceleration sensor G does not protrude more toward the vehicle width direction outer side than the nut N, the recessed portion 21a may be omitted. Also in another case, when the interval between the reinforcement 40 and the side member outer 20 at the position where the acceleration sensor G is fixed is sufficiently ensured, the recessed portion 21a may be omitted.

The shape of the reinforcement 40 is not necessarily similar to that of the side member outer 20. For example, the reinforcement 40 may have a flat plate shape, in the case of the reinforcement 40 having the flat plate shape, its portions fixed to the flange portions 23 of the side member outer 20 correspond to fixing portions, while, its portion spaced from the outer wall portion 21 of the side member outer 20 toward the vehicle width direction inner side corresponds to a main wall portion.

The reinforcement 40 may be fixed to portions, other than the flange portions 23, of the side member outer 20. As long as the reinforcement 40 has a portion (main wall portion) spaced from the side member outer 20 toward the vehicle width direction inner side, the reinforcement 40 may be fixed to the side wall portions 22 or the outer wall portion 21 of the side member outer 20 instead of or in addition to the flange portions 23.

The reinforcement 40 may reinforce only a part in the vehicle vertical direction of the side member outer 20. For example, the reinforcement 40 may be fixed to only a portion corresponding to the skirt portion H of the side member outer 20.

The manner of fixing the acceleration sensor G is not necessarily limited to the bolt B and the nut N. For example, when a housing (casing) of the acceleration sensor G is made of a metal, the acceleration sensor G may be fixed to the reinforcement 40 by welding. Alternatively, the acceleration sensor G may be fixed to the reinforcement 40 by an adhesive or the like. That is, as long as the fixing strength that can allow the position of the acceleration sensor G to be displaced corresponding to deformation of the reinforcement 40 can be ensured, any fixing manner may be employed. When the reinforcement 40 and the acceleration sensor G are fixed together by welding or adhesive, it is satisfactory if the projecting portion 50 projects even just a little from the main wall portion 41 toward the vehicle width direction outer side.

The position in the vehicle vertical direction of the projecting portion 50 may be changed as appropriate. For example, the projecting portion 50 may be provided above the skirt portion H of the side member outer 20, i.e. not within the range of the skirt portion H of the side member outer 20 in the vehicle vertical direction. The position in the vehicle vertical direction of the projecting portion 50 may be determined according to a portion in the vehicle vertical direction where the side member outer 20 is likely to be deformed, or according to a portion in the vehicle vertical direction where the necessity for detecting deformation of the side member outer 20 early is high.

The raised portion 51 of the projecting portion 50 does not necessarily extend in the trapezoidal shape in side view. For example, the raised portion 51 may extend in a circular shape. Alternatively to the manner of extending to surround in the circular or polygonal shape, the raised portion 51 may extend linearly, for example. When the raised portion 51 extends linearly, the front end wall portion 52 may be formed so as to extend in the vehicle vertical direction from edges on the vehicle width direction outer side of the raised portion 51.

The raising direction of the raised portion 51 of the projecting portion 50 can be changed as appropriate. For example, the acceleration sensor G is not necessarily located on the virtual straight line L that is extended on the outer surface of the upper portion 51a of the raised portion 51 according to the inclination of the upper portion 51a. Further, the raised portion 51 is not necessarily inclined and may be raised perpendicularly to the portion, where the projecting portion 50 is not provided, of the main wall portion 41.

The opening 52a in the front end wall portion 52 of the projecting portion 50 may be omitted. Whether or not to provide the opening 52a may be determined according to a request for productivity or weight reduction of the reinforcement 40 or the like. The front end wall portion 52 of the projecting portion 50 may be omitted. The projecting portion 50 may include only the raised portion 51 when the raised portion 51 has a portion that is located more on the vehicle width direction outer side than the front end of the bolt B in the main wall portion 41 of the reinforcement 40. When the reinforcement 40 and the acceleration sensor G fixed together by welding or adhesive, it is satisfactory if the raised portion 51 extends so as to be located more on the vehicle width direction outer side than the main wall portion 41.

Instead of forming the projecting portion 50 by deforming a part of the main wall portion 41 of the reinforcement 40, a projecting portion 50 as a separate member from the main wall portion 41 may be fixed to the main wall portion 41 on the vehicle width direction outer side.

What is claimed is:

1. A vehicle side portion structure comprising:
an outer member extending along a vehicle vertical direction;
an inner member disposed closer to a center of a vehicle than the outer member in a vehicle width direction and facing the outer member, the inner member partially fixed to the outer member, the inner member and the outer member forming a tubular shape having a space;
a main wall portion provided in the space, the main wall portion extending along the outer member, the main wall portion being spaced from the outer member, an acceleration sensor fixed to the main wall portion, the main wall portion being provided with a projecting portion, the projecting portion projecting to be further from the center of the vehicle than a fixing position where the acceleration sensor is fixed in the vehicle width direction, the projecting portion includes a raised portion that is raised to be further from the center of the vehicle than the fixing position in the vehicle width direction; and
a fixing portion connected to the main wall portion, the fixing portion being configured to be fixed to the outer member,
wherein when a virtual straight line is drawn on the raised portion along its raising direction in a sectional view perpendicular to a vehicle longitudinal direction, the raised portion has a portion that is inclined such that the acceleration sensor is located on the virtual straight line.

2. The vehicle side portion structure according to claim 1, wherein
the fixing portion and the main wall portion constitute a reinforcement.

3. The vehicle side portion structure according to claim 1, wherein
the fixing portion is fixed to an inner surface of the outer member in the vehicle width direction.

4. The vehicle side portion structure according to claim 1, wherein
the acceleration sensor is fixed to a surface, facing the inner member, of the main wall portion.

5. The vehicle side portion structure according to claim 1, wherein
the outer member includes an outer wall portion, a pair of side wall portions, and a pair of flange portions,
the outer wall portion extends along the vehicle vertical direction,
the pair of side wall portions respectively extend toward the center of the vehicle in the vehicle width direction from edges in a vehicle longitudinal direction of the outer wall portion, and
the pair of flange portions each extend in a direction of separating each other from an inner edge in the vehicle width direction of the side wall portion corresponding to each flange portion.

6. The vehicle side portion structure according to claim 5, wherein
the pair of side wall portions include
a front side wall portion extending toward the inner member from a front edge of the outer wall portion in the vehicle longitudinal direction, and
a rear side wall portion extending toward the inner member from a rear edge of the outer wall portion in the vehicle longitudinal direction.

7. The vehicle side portion structure according to claim 6, wherein
the pair of flange portions include
a front flange portion extending forward of the vehicle from the inner edge of the front side wall portion in the vehicle width direction, and
a rear flange portion extending rearward of the vehicle from the inner edge of the rear side wall portion in the vehicle width direction.

8. The vehicle side portion structure according to claim 5, wherein
the outer member includes, at lower portion of the outer member in the vehicle vertical direction, a skirt portion in which the pair of side wall portions each extend in an arc shape so as to be separate from each other in the vehicle longitudinal direction as going downward of the vehicle, and
the projecting portion is provided within a range in the vehicle vertical direction, the range being same as a range in the vehicle vertical direction in which the skirt portion is provided.

* * * * *

UNITED STATES PATENT AND TRADEMARK OFFICE
CERTIFICATE OF CORRECTION

PATENT NO. : 10,576,923 B2
APPLICATION NO. : 15/903408
DATED : March 3, 2020
INVENTOR(S) : Ryusuke Tanaka It is certified that error appears in the above-identified patent and that said Letters Patent is hereby corrected as shown below:

On the Title Page

Item (72), inventor, address, delete "Toyota" and insert --Toyota-shi, Aichi-ken--, therefor.

In the Specification

In Column 3, Line 56, delete "vide" and insert --view--, therefor.

In Column 10, Line 60, after "difficult", delete "fir" and insert --for--, therefor.

In Column 11, Line 29, delete "belt B" and insert --bolt B--, therefor.

Signed and Sealed this
Fifth Day of May, 2020

Andrei Iancu
*Director of the United States Patent and Trademark Office*